US00RE39450E

(19) United States
(12) Reissued Patent
Rodrigues et al.

(10) Patent Number: US RE39,450 E
(45) Date of Reissued Patent: Dec. 26, 2006

(54) POLYVINYLPYRRIDINIUM DERIVATIVES AS ANTI-DYE TRANSFER AGENTS

(75) Inventors: Klein A. Rodrigues, Signal Mountain, TN (US); John S. Thomaides, Berkeley Heights, NJ (US)

(73) Assignee: National Starch and Chemical Investment Holding Co, New Castle, DE (US)

(21) Appl. No.: 10/369,911

(22) Filed: Feb. 20, 2003

Related U.S. Patent Documents

Reissue of:
(64) Patent No.: 6,191,098
Issued: Feb. 20, 2001
Appl. No.: 09/300,913
Filed: Apr. 28, 1999

(51) Int. Cl.
*C11D 3/37* (2006.01)
*C08F 228/02* (2006.01)

(52) U.S. Cl. ..... 510/475; 526/265
(58) Field of Classification Search ..... 526/265; 510/475, 476
See application file for complete search history.

(56) References Cited

U.S. PATENT DOCUMENTS

| | | | | | |
|---|---|---|---|---|---|
| 3,478,001 | A | * | 11/1969 | Bahr et al. | 526/265 |
| 4,882,405 | A | * | 11/1989 | Schulz et al. | 526/265 |
| 5,458,809 | A | * | 10/1995 | Fredj et al. | 510/276 |
| 5,460,752 | A | * | 10/1995 | Fredj et al. | 510/276 |
| 5,466,802 | A | * | 11/1995 | Panandiker et al. | 510/320 |
| 5,627,151 | A | * | 5/1997 | Detering et al. | 510/475 |
| 5,776,897 | A | * | 7/1998 | Lewis et al. | 514/12 |

FOREIGN PATENT DOCUMENTS

| | | |
|---|---|---|
| DE | 1207630 | * 12/1965 |
| DE | 2814287 | * 11/1979 |
| DE | 4027832 | * 3/1992 |
| EP | 327927 | * 8/1989 |
| EP | 372291 | * 6/1990 |
| EP | 754748 | * 1/1997 |
| WO | 95/03390 | * 10/1995 |
| WO | 95/27038 | * 10/1995 |

OTHER PUBLICATIONS

R. Montiel et al., J. Mater., Res. (1995), 10(8), 2106–13 (abstract), Oct., 1995.*

* cited by examiner

*Primary Examiner*—John R. Hardee
(74) *Attorney, Agent, or Firm*—Thomas Roland

(57) ABSTRACT

A water-soluble polyvinylpyrridinium derivative containing a quaternary nitrogen and an anionic moiety selected from a sulfonate and/or a carboxylate functionality, said polyvinylpyrridinium derivative having the structure

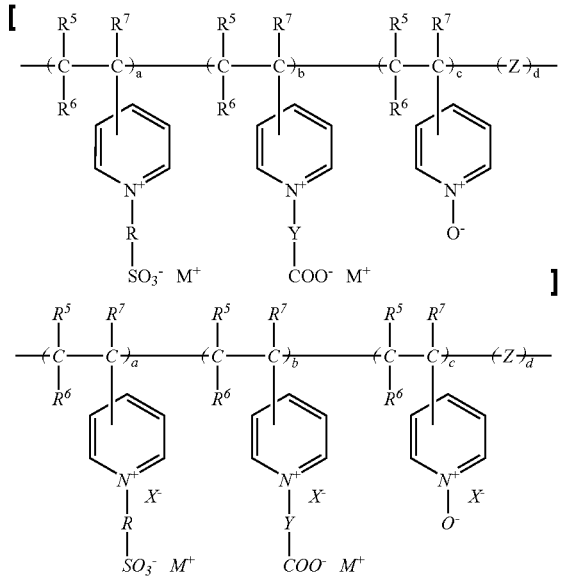

wherein a is a repeating unit of 1 to 100; b is a repeating unit of 0 to 99; c is a repeating unit of 0 to 99; d is a repeating unit of [0] *1* to 99; R is selected from the group consisting of $(CR_1R_2)_{m1}$, benzene, and substituted benzene; Y is selected from the group consisting of $(CR_3R_4)_{m2}$, benzene, and substituted benzene; substituted benzene is independently a benzene substituted with a group selected from the group consisting of amino [moeity] *moiety*, nitro moiety, halogen moiety, and combinations thereof; Z is derived from an ethylenically unsaturated monomer; $m_1$ and $m_2$ are independently 0 to 10; $M^+$ is independently a cation wherein M is selected from the group consisting of hydrogen, ammonia, alkali metals, alkaline earth metals, zinc, copper, organic amines, amino acids, and amino saccharides; $R_1$, $R_2$, $R_3$, and $R_4$ are independently selected from the group consisting of hydrogen, hydroxyl, alkyl having $C_1$ to $C_6$, aryl having $C_6$ to $C_{18}$, and alkaryl having $C_7$ to $C_{18}$; and $X^-$ is independently a halide, with the proviso that if Y is benzene or substituted benzene then a is 0 to 99 and b is 1 to 100. The polyvinylpyrridinium derivatives inhibit dye transfer in detergent compositions having a high level of anionic surfactants without adversely affecting stain or soil removal or soil redeposition.

9 Claims, No Drawings

POLYVINYLPYRRIDINIUM DERIVATIVES AS ANTI-DYE TRANSFER AGENTS

Matter enclosed in heavy brackets [ ] appears in the original patent but forms no part of this reissue specification; matter printed in italics indicates the additions made by reissue.

FIELD OF THE INVENTION

This invention relates to water-soluble polyvinylpyrridinium derivative containing a quaternary nitrogen and an anionic moiety selected from a sulfonate or a carboxylate functionality. The polyvinylpyrridinium derivatives are useful as anti-dye transfer and color protection agents in detergent compositions, especially detergent compositions containing a high level of anionic surfactants.

BACKGROUND OF THE INVENTION

One of the most persistent and troublesome problems arising during modern fabric laundering operations is the tendency of some colored fabrics to release dye into the laundering solutions. The dye is then transferred onto other fabrics being washed therewith.

One way of overcoming this problem would be to complex or adsorb the fugitive dyes washed out of dyed fabrics before they have the opportunity to become attached to other articles in the wash. Polyvinylpyrrolidone, by virtue of its dye complexation ability, has been used to inhibit dye deposition during washing of colored fabrics under laundry conditions. The performance of polyvinylpyrrolidone as a dye transfer inhibitor, however, is adversely affected by the presence of high levels of anionic surfactants in the washing process.

Other polymers which have been used in detergent compositions to inhibit dye transfer include polyvinylimidazole, polyvinylpyridine N-oxide, polyvinylimidazole and copolymers of polyvinylpyridine and polyvinylimidazole. DE 2 814 287-A describes detergent compositions containing N-vinyl imidazole homo- or copolymers in combination with anionic and/or nonionic surfactants and other detergent ingredients. WO 95/03390 describes dye inhibiting polymers of polyvinylpyrrolidone, polyamine N-oxide, and vinylimidazole. U.S. Pat. No. 5,460,752 describes polyamine N-oxide polymers.

U.S. Pat. No. 5,627,151 describes copolymers of vinylpyrrolidone or vinylimidazole, vinylpyridine or dimethylaminoethyl methacrylate or dimethylaminopropylmethacrylamide, including up to 20% vinylacetate, for use in laundry detergents. U.S. Pat. No. 5,466,802 describes poly(4-vinylpyridine-N-oxide) and copolymers of vinylpyrrolidone and vinylimidazole. EP 754748 describes vinylpyridine copolymers and formic acid. U.S. Pat. No. 5,458,809 describes poly(4-vinylpyridine-N-oxide). WO 95/27038 describes poly(4-vinylpyridine-N-oxide), polyvinylpyrrolidone, polyvinylpyrrolidone-vinylimidazole and copolymers of vinylpyrrolidone and vinylimidazole.

EP 372 291 describes a process for washing discoloration-sensitive textiles. The wash liquor contains anionic/nonionic surfactants and water-soluble polymers, for example, copolymers N-vinylimidazole, N-vinyloxazolidone or N-vinylpyrrolidone. EP 327 927 describes a granular detergent additive comprising water-soluble polymeric compounds based on N-vinylpyrrolidone and/or N-vinylimidazole and/or N-vinyloxazolidone and cationic compounds. DE 4027832 describes electrolyte-free liquid detergent compositions comprising zeolite A, nonionic surfactants and homo- and copolymers selected from N-vinylpyrrolidone and/or N-vinylimidazole and/or N-vinyloxazolidone. U.S. Pat. No. 5,776,879 describes water-soluble poly(vinylpyridine betaines) containing a quaternary nitrogen and a carboxylate salt, which have effective dye transfer inhibitor properties.

It would be advantageous to develop a polymer which provides anti-dye transfer and color protection properties to detergent compositions having a high level of anionic surfactants. The polymer should also provide anti-dye transfer and color protection properties without adversely affecting stain or soil removal or soil redeposition. In addition, the polymer should be effective on a broad range of dyes present in the wash water.

SUMMARY OF THE INVENTION

The invention provides a water-soluble polyvinylpyrridinium derivative comprising a quaternary nitrogen and an anionic moiety selected from a sulfonate and/or a carboxylate functionality. The polyvinylpyrridinium derivative has the structure:

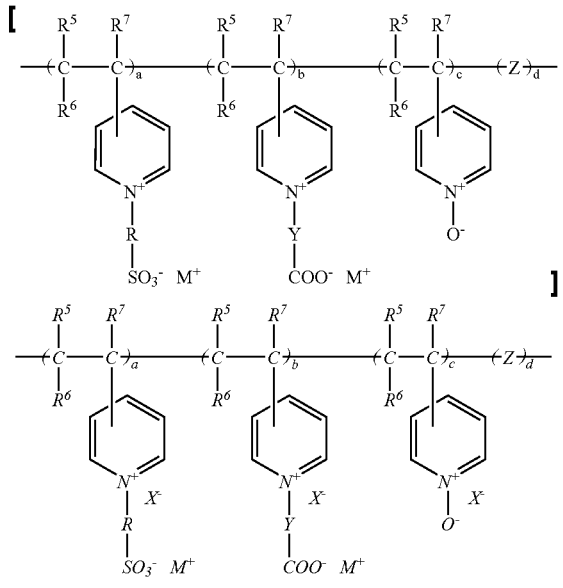

wherein a is a repeating unit of 1 to 100; b is a repeating unit of 0 to 99; c is a repeating unit of 0 to 99; d is a repeating unit of 0 to 99; R is selected from the group consisting of $(CR_1R_2)_{m1}$, benzene, and substituted benzene; Y is selected from the group consisting of $(CR_3R_4)_{m2}$, benzene, and substituted benzene; substituted benzene is independently a benzene substituted with a group selected from the group consisting of amino moeity, nitro moiety, halogen moiety, and combinations thereof; Z is derived from an ethylenically unsaturated monomer; $m_1$ and $m_2$ are independently 0 to 10; $M^+$ is independently a cation wherein M is selected from the group consisting of hydrogen, ammonia, alkali metals, alkaline earth metals, zinc, copper, organic amines, amino acids, and amino saccharides; $R_1$, $R_2$, $R_3$, and $R_4$ are independently selected from the group consisting of hydrogen, hydroxyl, alkyl having $C_1$ to $C_6$, aryl having $C_6$ to $C_{18}$, and alkaryl having $C_7$ to $C_{18}$; and $X^-$ is independently a halide, with the proviso that if Y is benzene or substituted benzene then a is 0 to 99 and b is 1 to 100.

The polyvinylpyrridinium derivatives of the invention inhibit dye transfer in detergent compositions having a high level of anionic surfactants. The polymer also provides anti-dye transfer and color protection properties without adversely affecting stain or soil removal or soil redeposition. In addition, the polymer is effective on a broad range of dyes present in the wash water.

DESCRIPTION OF THE INVENTION

In accordance with the invention, the water-soluble polyvinylpyrridinium derivative comprises a quaternary nitrogen and an anionic moiety selected from a sulfonate and/or a carboxylate functionality. The polyvinylpyrridinium derivative has the general structure:

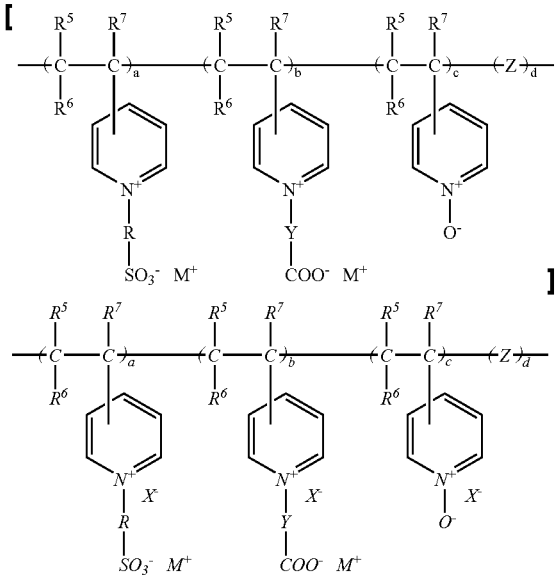

wherein a is a repeating unit of 1 to 100; b is a repeating unit of 0 to 99; c is a repeating unit of 0 to 99; d is a repeating unit of 0 to 99; R is selected from the group consisting of $(CR_1R_2)_{m1}$, benzene, and substituted benzene; Y is selected from the group consisting of $(CR_3R_4)_{m2}$, benzene, and substituted benzene; substituted benzene is independently a benzene substituted with a group selected from the group consisting of amino moeity, nitro moiety, halogen moiety, and combinations thereof; Z is derived from an ethylenically unsaturated monomer; $m_1$ and $m_2$ are independently 0 to 10; $M^+$ is independently a cation wherein M is selected from the group consisting of hydrogen, ammonia, alkali metals, alkaline earth metals, zinc, copper, organic amines, amino acids, and amino saccharides; $R_1$, $R_2$, $R_3$, and $R_4$ are independently selected from the group consisting of hydrogen, hydroxyl, alkyl having $C_1$ to $C_6$, aryl having $C_6$ to $C_{18}$, and alkaryl having $C_7$ to $C_{18}$; and $X^-$ is independently a halide, with the proviso that if Y is benzene or substituted benzene then a is 0 to 99 and b is 1 to 100.

In a preferred embodiment of the polyvinylpyrridinium derivative, a is 50 to 100; b is 0 to 50; c is 0 to 50; d is 0 to 50, more preferably a is 50 to 100; b is 0 to 10; c is 0 to 10; d is 0 to 50; R is selected from the group consisting of $(CR_1R_2)_{m1}$ and benzene; Y is selected from the group consisting of $(CR_3R_4)_{m2}$ and benzene; Z is derived from a nitrogen-containing ethylenically unsaturated monomer; $m_1$ and $m_2$ are independently 1 to 6; $M^+$ is independently a cation wherein M is sodium or potassium; $R_1$, $R_2$, $R_3$, and $R_4$ are independently hydrogen or hydroxyl; and $X^-$ is independently selected from fluoride, chloride, iodide, and bromide, more preferably chloride.

The letter Z represents the derivative of an ethylenically unsaturated monomer. Preferably, the ethylenically unsaturated monomer is a nitrogen-containing, ethylenically unsaturated monomer which may be in the form of free bases, salts with organic or inorganic acids, or in quaternized form. In addition, such nitrogen-containing, ethylenically unsaturated monomers may be functionalized to from the corresponding betaine or sultaine.

Suitable ethylenically unsaturated monomers are, for example, N,N'-dialkylaminoalkyl (meth)acrylates, eg. dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl arcylate, diethylaminopropyl methacrylate, dimethylaminobutyl acrylate, dimethylaminobutyl methacrylate, dimethylaminoneopentyl acrylate and dimethylaminoneopentyl methacrylate. Further suitable monomers of this group are N,N'-dialkylaminoalkyl (meth)acrylamides, eg. N,N'-di-C1-C3-alkylamino-C2-C6-alkyl(meth)acrylamides, such as dimethyl aminoethylacrylamide, dimethylaminoethyl methacrylamide, diethylaminoethylacrylamide, diethylaminoethylmethacrylamide, dipropylamino ethylacrylamide, dipropylaminoethylmethacrylamide dimethylaminopropylacrylamide, dimethylamino propylmethacrylamide, diethylaminopropylacrylamide, diethylaminopropylmethacrylamide, dimethylamino neopentylacrylamide, dimethylaminoneopentylmethacrylamide and dialkylaminobutylacrylamide. Further suitable monomers of this group are diallyl(di) alkylamines in which the alkyl group has from 1 to 12 carbon atoms.

The above mentioned nitrogen-containing, ethylenically unsaturated monomers are used in the copolymerization in the form of the free bases, in the form of the salts with organic or inorganic acids or in quaternized form. Suitable for salt formation are for example carboxylic acids having from 1 to 7 carbon atoms, e.g. formic acid, acetic acid or propionic acid, benzenesulfonic acid, p-toluenesulfonic acid or inorganic acids such as halohydric acids, eg. hydrochloric acid or hydrobromic acid. The above-exemplified monomers can also be used in quaternized form. Suitable quaternizing agents are for example alkyl halides having from 1 to 18 carbon atoms in the alkyl group, eg. methyl chloride, methyl bromide, methyl iodide, ethyl chloride, propyl chloride, hexyl chloride, dodecyl chloride, lauryl chloride and benzyl halides, in particular benzyl chloride and benzyl bromide. The quaternization of the nitrogen-containing basic monomers can also be effected by reacting these compounds with dialkyl sulfates, in particular diethyl sulfate or dimethyl sulfate. Examples of quaternized monomers of this group are trimethylammoniumethyl methacrylate chloride, dimethylethylammoniumethyl methacrylate ethosulfate and dimethylethylammoniumethyl methacrylamide ethosulfate. A combination of ethylenically unsaturated monomers may also be used.

The ethylenically unsaturated monomer is preferably selected from vinyl [pyrrolidone] *pyridine*, vinyl imidazolidone, dimethylaminoethylmethacrylate, and dimethylaminoethylacrylate.

The polyvinylpyrridinium derivative is preferably 100% functionalized to a polyvinylpyrridinium derivative, however, it is within the scope of the invention that any unreacted vinylpyrridine groups may be quaternized by compounds, as described above, or reacted with an acid to form the corresponding salt, as described above, or left unreacted.

In one embodiment of the invention, the water-soluble polyvinylpyrridinium derivatives of the invention are made by polymerizing a vinylpyridine under suitable polymerization conditions to form a poly(vinylpyridine) intermediate, and then reacting the poly(vinylpyridine) intermediate with unsaturated sulfonic acid or its salt in an aqueous medium. The reaction product is a polyvinylpyrridinium derivative containing a quaternary nitrogen and a sulfonate group.

In one embodiment of the invention, the water-soluble polyvinylpyrridinium derivatives of the invention are made by reacting a vinylpyridine monomer with a suitable reagent to form a vinylpyridine sultaine monomer, and then polymerizing the vinylpyridine sultaine monomer to form a polyvinylpyrridinium derivative containing a quaternary nitrogen and a sulfonate group.

Unfunctionalized pyridine groups in the polyvinylpyrridinium derivative may be further reacted to the corresponding betaine (repeating unit b) or amine oxide (repeating unit c). Other water soluble moieties may be copolymerized and incorporated into the polymer (repeating unit d). In a typical process, the vinyl pyridine may be polymerized in an alcohol water mixture and then reacted to form the corresponding sultaine. A small amount of base is added to the reaction mixture, alcohol is distilled off to produce a water soluble product. It is important to add the base before the distillation step to ensure that the final product is water soluble.

Although the reaction proceeds without a catalyst, a catalyst may be employed to speed up the reaction. Suitable catalysts are known to those skilled in the art.

In one embodiment, the polyvinylpyrridinium derivative is used in a fabric softening composition. The level of the polyvinylpyrridinium derivative in the fabric softening compositions positions is from about 0.01 to about 90 weight percent, more preferably from about 0.05 to about 20 percent, most preferably from about 0.1 to about 10 weight percent, based on the total weight of the fabric softening composition.

In one embodiment, the polyvinylpyrridinium derivative is used in the detergent compositions. The level of the polyvinylpyrridinium derivative in the detergent compositions is from about 0.01 to about 90 weight percent, more preferably from about 0.05 to about 20 percent, most preferably from about 0.1 to about 10 weight percent, based on the total weight of the detergent composition.

While not wishing to be bound by any particular theory, the present inventors believe that the polyvinylpyrridiniumn derivative of the invention inhibits dye transfer in laundering or washing processes containing the detergent composition by hydrogen bonding with dyes or through dipole-dipole interaction or electrostatic interaction with dyes which are present in wash water. The laundering or washing process is preferably carried out at about 5° C. to about 75° C., more preferably, from about 20° C. to about 60° C.

The detergent composition may be a solid or liquid composition. If the detergent composition is solid, the detergent composition may be in any of the usual physical forms, such as for example, powders, beads, flakes, bars, tablets, noodles, pastes, and slurries. If the detergent composition is liquid, the detergent composition preferably disperses or solubilizes the polyvinylpyrridinium derivative. The detergent composition may be aqueous or nonaqueous. For example, the polyvinylpyrridinium derivative may be dissolved or dispersed in water, in one or more solvents or inert diluents. Preferably the detergent composition is aqueous.

The detergent compositions may contain any additional components which are used in detergent compositions. Such additional components are well known to those skilled in the art and include one or more surfactants, builders, ion exchangers, alkalies, anticorrosion materials, antiredeposition materials, optical brighteners, fragrances, dyes, chelating agents, enzymes, whiteners, brighteners, antistatic agents, sudsing control agents, solvents, hydrotropes, bleaching agents, perfumes, bleach precursors, water, buffering agents, soil removal agents, soil release agents, softening agents, opacifiers, inert diluents, buffering agents, corrosion inhibitors, graying inhibitors, and stabilizers. Combinations of such additional components may also be used.

Suitable surfactants are nonionic, anionic, cationic, ampholytic, zwitterionic and semi-polar surfactants. A combination of surfactants may also be used.

Anionic surfactants include, for example, from $C_8$ to $C_{20}$ alkylbenzenesulfonates, from $C_8$ to $C_{20}$ alkanesulfonates, from $C_8$ to $C_{20}$ alkylsulfates, from $C_8$ to $C_{20}$ alkylsulfosuccinates or from $C_8$ to $C_{20}$ sulfated ethoxylated alkanols.

Nonionic surfactants include, for example, from $C_6$ to $C_{12}$ alkylphenol ethoxylates, from $C_8$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

Cationic surfactants contain hydrophilic functional groups where the charge of the functional groups are positive when dissolved or dispersed in an aqueous solution. Typical cationic surfactants include, for example, amine compounds, oxygen containing amines, and quaternary amine salts.

Amphoteric surfactants contain both acidic and basic hydrophilic groups. Amphoteric surfactants are preferably derivatives of secondary and tertiary amines, derivatives of quaternary ammonium, quaternary phosphonium or tertiary sulfonium compounds. The cationic atom in the quaternary compound can be part of a heterocyclic ring. The amphoteric surfactant preferably contains at least one aliphatic group, containing about 3 to about 18 carbon atoms. At least one aliphatic group preferably contains an anionic water-solubilizing group solubilizing group such as a carboxy, sulfonate, or phosphono.

Generally, anionic surfactants, such as linear alkyl sulfonates (LAS) are preferred for use in solid detergent compositions containing the polyvinylpyrridinium derivative. Nonionic and anionic surfactant mixtures such as alcohol ethoxylates and LAS are preferred in liquid detergent compositions containing the polyvinylpyrridinium derivative. The surfactants are optionally present in an amount of from about 0 to about 50 weight percent, preferably from about 2 to about 45 weight percent, and more preferably from about 5 to about 40 weight percent, based on the total weight of the detergent composition.

Examples of bleaching agents are perborates, percarbonates, or chlorine-generating substances such as chloroisocyanurates. Examples of silicates used as corrosion inhibitors are sodium silicate, sodium disilicate, and sodium metasilicate. Examples of graying inhibitors are carboxymethylcellulose, methylcellulose, hydroxypropylmethyl-cellulose, and polyacrylic acid and copolymers of acrylic and maleic acid.

Examples of enzymes are proteases, amylases, lipases, cellulases, and peroxidases, as well as mixtures thereof. Other types of enzymes may also be included. They may be of any suitable origin, such as vegetable, animal, bacterial, fungal and yeast origin.

Any conventional builder system is suitable for use in the detergent composition including aluminosilicate materials, silicates, polycarboxylates and fatty acids, materials such as ethylenediamine tetraacetate, metal ion sequestrants such as aminopolyphosphonates, particularly ethylenediamine tetramethylene phosphonic acid and diethylene triamine pentamethylenephosphonic acid. Though less preferred for obvious environmental reasons, phosphate builders can also be used herein.

Suitable builders can be an inorganic ion exchange material, commonly an inorganic hydrated aluminosilicate material, more particularly a hydrated synthetic zeolite such as hydrated zeolite A, X, B or HS. Another suitable inorganic builder material is layered silicate, e.g., SKS-6 (Hoechst). SKS-6 is a crystalline layered silicate consisting of sodium silicate ($Na_2Si_2O_5$). The preferred polycarboxylates are hydroxycarboxylates containing up to three carboxy groups per molecule, more particularly citrates.

Preferred builder systems for use in the detergent compositions include a mixture of a water-insoluble aluminosilicate builder such as zeolite A or of a layered silicate (SKS/6), and a water-soluble carboxylate chelating agent such as citric acid.

A suitable chelant for inclusion in the detergent compositions is ethylenediamine-N,N'-disuccinic acid (EDDS) or the alkali metal, alkaline earth metal, ammonium, or substituted ammonium salts thereof, or mixtures thereof.

Examples of suds suppressors are silicones and silica-silicone mixtures. Silicones can be generally represented by alkylated polysiloxane materials while silica is normally used in finely divided forms exemplified by silica aerogels and xerogels and hydrophobic silicas of various types.

Examples of antiredeposition and soil suspension agents are cellulose derivatives such as methylcellulose, carboxymethylcellulose and hydroxyethylcellulose, and homopolymers of acrylic acid and copolymers of maleic acid and acrylic acid.

Examples of optical brighteners are disodium 4,4$^1$-bis-(2-diethanolamino-4-anilino-s-triazin-6-ylamino)stilbene-2:2$^1$disulphonate, disodium 4,-4$^1$-bis-(2-morpholino-4-anilino-s-triazin-6-ylaminostilbene-2:2$^1$-disulphonate, disodium 4,4$^1$-bis-(2,4-dianilino-s-triazin-6-ylamino) stilbene-2:2$^1$-disulphonate, monosodium 4$^1$,4$^{11}$-bis-(2,4-dianilino-s-triazin-6ylamino)stilbene-2-sulphonate, disodium 4,4$^1$-bis-(2-anilino-4-(N-methyl-N-2-hydroxyethylamino)-s-triazin-6-ylamino)stilbene-2,2$^1$-disulphonate, disodium 4,4$^1$-bis-(4-phenyl-2,1,3-triazol-2-yl)-stilbene-2,2$^1$disulphonate, disodium 4,4$^1$bis(2-anilino-4-(1-methyl-2-hydroxyethylamino)-s-triazin-6-ylamino) stilbene-2,2$^1$disulphonate, and sodium 2(stilbyl-4$^{11}$-(naphtho-1$^1$,2$^1$:4,5)-1,2,3-triazole-2$^{11}$-sulphonate.

Other useful polymeric materials which may be added to the detergent compositions are polyethylene glycols, particularly those of molecular weight 1000–10000, more particularly 2000 to 8000 and most preferably about 4000. These optional polymeric materials including the previously mentioned homo- or copolymeric polycarboxylate salts are valuable for improving whiteness maintenance, fabric ash deposition, and cleaning performance on clay, proteinaceous and oxidizable soils in the presence of transition metal impurities.

Examples of soil release agents are conventional copolymers or terpolymers of terephthalic acid with ethylene glycol and/or propylene glycol units in various arrangements, as well as the ethoxylated/propoxylated polyamines. Modified polyesters may also be used as soil release agents, and include random copolymers of dimethyl terephtalate, dimethyl sulfoisophtalate, ethylene glycol and 1-2 propane diol, the end groups consisting primarily of sulphobenzoate and secondarily of mono esters of ethylene glycol and/or propane-diol.

The following nonlimiting examples illustrate further aspects of the invention.

EXAMPLE 1

Synthesis of Polyvinyl Pyridine Functionalized with 1,3 Propane Sultone to Form a Polyvinylpyrridinium Derivative 5.0 grams of polyvinyl pyridine having a molecular weight of 50,000 (obtained from Polysciences, Inc.) was dissolved in isopropanol. 1,3-propane sultone 11.6 grams (0.0476 mol) was added to the reactor over 5 minutes at ambient temperature. A bluish green solid precipitated out of solution in about 30 minutes to an hour and was accompanied by a temperature increase to 35° C. The solid product was isolated and then dried in an oven at 80° C. overnight. A dry product weighing 20.7 grams was obtained.

EXAMPLE 2

Evaluation of Polyvinylpyrridinium Derivative of Example 1 in Detergent Compositions An aqueous solution of the polyvinylpyrridinium derivative, 0.1 g, prepared in Example 1 was dissolved in 5 g of 2M NaCl and evaluated for anti-dye transfer properties in commercially available detergent compositions. The test involved washing 1 white cotton swatch with 4 swatches dyed with Direct Blue 1, 4 swatches dyed with Direct Blue 90, and 1 white cotton 400. These swatches are commercially available from Test Fabrics in New Jersey. The test was conducted in a terg-o-tometer using 2.0 g/l of detergent and the polymer solution prepared above. The test was conducted at 93.4° F., 80 rpm and 110 PPM hardness water. The wash was 20 minutes and was followed by a 3 minute rinse. The swatches were then dried and the L values (whiteness) of the white swatches were measured using a Minolta calorimeter. A higher L value for the white swatch indicates that less dye is being transferred to the swatch and is a measure of the effectiveness of the dye transfer polymer. The test results are summarized in Table I.

TABLE I

Evaluation of dye transfer properties.

| Commercial liquid detergent composition | Polyvinylpyrridinium derivative | L value of white swatch |
|---|---|---|
| Arm and Hammer | None | 78.3 |
| Arm and Hammer | Example 1 | 89.3 |
| Wisk | None | 76.7 |
| Wisk | Example 1 | 87.5 |

The results in Table I show that colored swatches washed in the detergent compositions containing the polyvinylpyrridinium derivative prepared in Example 1 were significantly whiter, as determined by the higher L values, than the swatches washed in the detergents without the polymer of the invention. Thus, the polyvinylpyrridinium derivatives prevent dyes which are present in the wash water from depositing on clothing.

EXAMPLE 3

Synthesis of Betaine (20 mole %) and Sultaine (80 mole %) Polyvinyl Pyridine Derivatives 5.0 grams of poly(4-vinyl pyridine), 0.0476 mol, having a molecular weight of 50,000 (obtained from Polysciences, Inc.) was dissolved in 50.0 grams of isopropanol. The mixture was heated to 60° C. in a reactor to dissolve the polymer. A solution of 1.1 grams of sodium chloro acetate, 0.0095 mol, and 7.45 grams of 3-chloro-2-hydroxy-1-propane sulfonic acid, sodium salt hydrate, 0.038 mol, dissolved in 50 grams of deionized water, was added to the reactor. The mixture was heated to 80° C. and held at that temperature for 5 to 6 hours. The isopropanol was distilled off by raising the temperature of 100° C. After cooling, the product was a clear yellow solution with no undissolved solids.

EXAMPLE 4

Comparison Example—Synthesis of a Polyvinyl Pyridine Derivative having 20 Mole Percent Betaine Functionality 5.0 grams of poly(4 vinyl pyridine), 0.0476 mol, having a molecular weight of 50,000 (obtained from Polysciences, Inc.) was dissolved in 50.0 grams of isopropanol. The mixture was heated to 60° C. to dissolve the polymer. A solution of 1.1 grams of sodium chloro acetate, 0.0095 mol, dissolved in 50 grams of deionized water was added to the reactor. The mixture was heated to 80° C. and held at that temperature for 5 to 6 hours. The isopropanol was distilled off by raising the temperature of the reactor. A Dean stark trap was used to collect the isopropanol. After cooling, the product was a opaque yellow solution which separated into two phases which indicated that this polymer was chemically different than the polymer prepared in Example 3.

EXAMPLE 5

Comparison of the Anti-dye Transfer Properties for the Polyvinylpyrridinium Derivative Prepared in Example 3 and the Polyvinylpyrridinium Betain Prepared in Example 4

The test involved washing 1 white cotton swatch with 4 swatches dyed with Direct Blue 1, 4 swatches dyed with Direct Blue 90, and 1 white cotton 400. These swatches are commercially available from Test Fabrics in New Jersey. The test was conducted in a terg-o-tometer using 2.0 g/l of Arm & Hammer liquid detergent and various amounts of polymer as listed in Table II. The test was conducted at 93.4° F., 80 rpm and 110 PPM hardness water. The wash was 20 minutes and was followed by a 3 minute rinse. The swatches were then dried and the L values (whiteness) of the white swatches were measured using a Minolta calorimeter. A higher L value for the white swatch indicate that less dye is being transferred to the swatch and is a measure of the effectiveness of the dye transfer polymer. The test results are summarized in Table II.

TABLE II

Evaluation of anti-dye transfer properties.

| Polymer | Weight percent polymer based on weight of detergent | L value of white swatch |
|---|---|---|
| None | — | 78.5 |
| Example 3 | 0.1 | 80.0 |
| Example 4 | 0.1 | 78.3 |
| Example 3 | 0.5 | 81.6 |
| Example 4 | 0.5 | 78.9 |

The test results in Table II show that less dye was transferred during washing of the white swatches with the detergent containing polyvinylpyrridinium derivative prepared in Example 3 as compared to the white swatches that were washed with the detergent containing the polyvinylpyrrolidinium betain prepared in Example 4. In addition, the results show that 0.1% of the polyvinylpyrridinium derivative prepared in Example 3 exhibits superior anti-dye transfer properties as compared to 0.5% of the polyvinylpyrridinium betaine prepared in Example 4.

EXAMPLE 6

Preparation of a Copolymer of Vinylpyrridinium Sultaine and Acrylamide

A mixture of 50 grams of water and 50 grams of isopropanol was added to a reactor. The mixture was heated to 80° C. A mixture of 50 grams of vinyl pyridine and 68.6 grams of a 50 wt % aqueous solution of acrylamide were added to the reactor over a period of 1 hour. This was accompanied by simultaneous addition of an aqueous solution of 0.8 grams of ammonium persulafte in 30 grams of deionized water over a period of 1.5 hours. The reaction mixture was held at 80° C. for 1 to 2 hours. An aqueous solution containing 93.1 grams of 3-chloro-2-hydroxy-1-propane sulfonic acid, sodium salt hydrate dissolved in 238 grams of deionized water was added to the reactor over a period of 15 minutes. The reaction was held at 80° C. for 3 to 4 hours. The isopropanol was distilled off by slowly raising the temperature to 100° C. After cooling, the product was a dark brown aqueous solution.

EXAMPLE 7

Evaluation of the Anti-dye Transfer Properties of the Copolymer of Vinylpyrridinium Sultaine and Acrylamide Prepared in Example 6

The test involved washing 1 white cotton swatch with 4 swatches dyed with Direct Blue 1, 4 swatches dyed with Direct Blue 90, and 1 white cotton 400. These swatches are commercially available from Test Fabrics in New Jersey. The test was conducted in a terg-o-tometer using 2.0 g/l of WISK liquid detergent and 5.0 weight % of the copolymer. The test was conducted at 93.4° F., 80 rpm and 110 PPM hardness water. The wash was 20 minutes and was followed by a 3 minute rinse. The swatches were then dried and the L values (whiteness) of the white swatches were measured using a Minolta calorimeter. A higher L value for the white swatch indicate that less dye is being transferred to the swatch and is a measure of the effectiveness of the dye transfer polymer. The test results are summarized in Table III.

TABLE III

Evaluation of anti-dye transfer properties.

| Copolymer of vinylpyrridinium sultnine and acrylamide | L value of white swatch |
|---|---|
| None | 78.8 |
| Example 6 | 84.1 |

The test results in Table III show that the copolymer of vinylpyrridinium sultaine and acrylamide prepared in Example 6 exhibited significantly higher anti-dye transfer properties as compared to the same detergent composition without the copolymer.

EXAMPLE 8

Determination of whether the Polyvinylpyrridinium Derivative Prepared in Example 3 and the Copolymer of Vinylpyrridinium Sultaine and Acrylamide Prepared in Example 6 Effect Stain Removal in a Detergent Composition A primary detergency test was conducted using a Blood/Milk/Ink (BMI) stain that was obtained from Test Fabrics. The test consisted on washing a BMI obtained swatch with 9 white swatches as ballast. These swatches are commercially available from Test Fabrics in New Jersey. The test was conducted in a terg-o-tometer using 1.9 g/l of detergent (commercially available Arm and Hammer powder) and 5.0 wt. polymer. The test was conducted at 93° F., 80 rpm and 110 PPM hardness water. The wash was 20 minutes and was followed by a 3 minute rinse. The swatches were then dried and the L values of the BMI swatches were measured using a Minolta calorimeter. Higher L values for the BMI swatches indicate better detergency and that the stain is not being held on. The test results are summarized in Table IV.

TABLE IV

Evaluation of primary detergency properties.

| Polymer or Copolymer | L value of white swatch in primary detergency | L value of BMI swatch in primary detergency |
|---|---|---|
| None | 92.9 | 57.5 |
| Example 3 | 92.7 | 58.8 |
| Example 6 | 92.8 | 59.0 |

The test results in Table IV show that the polyvinylpyrridinium derivative prepared in Example 3 and the copolymer of vinylpyrridinium sultaine and acrylamide prepared in Example 6 do not adversely affect stain removal since the L value of the BMI swatch in the presence of the polymer or copolymer is at least equal to or greater than that of the control. Furthermore, the L values of the white swatch indicate that the polymer and copolymer do not have an adverse effect on anti-redeposition properties since L value of the white swatch in the presence of the polymer or copolymer is at least equal to or greater than that of the control.

EXAMPLE 9

Anti-dye Transfer in the Rinse (fabric softener)

The polyvinylpyrridinium derivative prepared in Example 3 was added to rinse water along with DOWNY, a commercially available fabric softener. The copolymer of vinylpyrridinium sultaine and acrylamide prepared in Example 6 was added to rinse water along with a fabric softener. A control sample was evaluated wherein the fabric softener was used without any polymer or copolymer. The fabric softener was dosed at 0.48 g/L. The anti-dye transfer polymer or copolymer was added to the rinse at 5% of this amount based upon dry polymer. There was a 10 min. rinse in 110 PPM. hard water. The rinse included 4 Direct Blue 1, 4 Direct Blue 90, and 1 White cotton #400 swatch. The swatches were 4.5×6 in. This was followed by 10–15 min. of drying in a commercial washer that was on the "Whites" setting. The dye transfer was evaluated by measuring the L values on a Minolta spectrophotometer. The test results are summarized in Table V.

TABLE V

| Polymer or Copolymer | L value of white swatch without fabric softener | L value of white swatch with fabric softener |
|---|---|---|
| None | 79.2 | 91.5 |
| Example 3 | 90.3 | 92.2 |
| Example 6 | 91.5 | 92.9 |

The test results in Table V show that the polyvinylpyrridinium derivative prepared in Example 3 and the copolymer of vinylpyrridinium sultaine and acrylamide prepared in Example 6 have anti-dye transfer benefit in the rinse cycle both with and without a commercial fabric softener.

EXAMPLE 10

Synthesis of a Polyvinylpyrridinium Derivative 5.0 grams of poly(4 vinyl pyridine), 0.0476 mol, having a molecular weight of 50,000 (obtained from Polysciences, Inc.) was dissolved in 50.0 grams of isopropanol. The mixture was heated to 60° C. in a reactor to dissolve the polymer. A solution of 7.45 grams of 3-chloro-2-hydroxy-1-propane sulfonic acid, sodium salt hydrate, 0.038 mol, dissolved in 50 grams of deionized water, was added to the reactor. The mixture was heated to 80° C. and held at that temperature for 5 to 6 hours. 1.2 grams of a 50% solution of sodium hydroxide was added to the reaction. The isopropanol, 55 g, was distilled off by raising the temperature of the reaction and using a dean stark trap. After cooling, 35 grams of deionized water was added to the reaction product. The final product was a dark black solution and contained approximately 17.3 wt % polyvinylpyrridinium derivative.

EXAMPLE 11

Preparation of a Sultaine of a Copolymer of Vinylpyridine and Dimethylaminoethylmethacrylate (DMAEMA)

A mixture of 50 grams of water and 30 grams of isopropanol was added to a reactor. The mixture was heated to 80° C. A monomer feed consisting of 50 grams of vinyl pyridine and another separate feed consisting of 49.8 grams of DMAEMA were added to the reactor over a period of 1 hour. This was accompanied by simultaneous addition of an aqueous solution of 1.0 grams of ammonium persulfate in 30 grams of deionized water over a period of 1.5 hours. Also, 0.5 grams of 3-mercaptopropionic acid dissolved in 20 grams of D1 water was added over 1 hour simultaneously in to the reactor. The reaction mixture was held at 80° C. for 1 to 2 hours. An aqueous solution containing 98.0 grams of 3-chloro-2-hydroxy-1-propane sulfonic acid, sodium salt hydrate dissolved in 250 grams of deionized water was added to the reactor over a period of 15 minutes. The reaction was held at 80° C. for 13 to 14 hours. The isopropanol was distilled off while slowly raising the temperature to 100° C. After cooling, the product was a dark red aqueous solution containing approximately 36 weight percent of the copolymer of vinylpyridine and dimethylaminoethylmethacrylate.

EXAMPLE12

Evaluation of the Anti-dye Transfer Properties of the Polyvinylpyrridinium Derivative Prepared in Example 10 and the Copolymer of Vinylpyridine and Dimethylaminoethylmethacrylate Prepared in Example 11, in a Detergent The test involved washing 1 white cotton swatch with 4 swatches dyed with Direct Blue 1, 4 swatches dyed with Direct Blue 90, and 1 white cotton 400. These swatches are commercially available from Test Fabrics in New Jersey. The test was conducted in a terg-o-tometer using 2.0 g/l of Wisk liquid detergent and 1.0 wt. polymer. The test was conducted at 93.4° F., 80 rpm and 110 PPM hardness water. The wash was 20 minutes and was followed by a 3 minute rinse. The swatches were then dried and the L values (whiteness) of the white swatches were measured using a Minolta colorimeter. A higher L value for the white swatch indicate that less dye is being transferred to the swatch and is a measure of the effectiveness of the dye transfer polymer. The test results are summarized in Table VI.

TABLE VI

Evaluation of anti-dye transfer properties.

| Polymer or Copolymer | L value of white swatch |
|---|---|
| None | 78.5 |
| Example 10 | 86.3 |
| Example 11 | 86.0 |

The test results in Table VI show that detergent compositions containing either the polyvinylpyrridinium derivative prepared in Example 10 or the copolymer of vinylpyridine and dimethylaminoethylmethacrylate prepared in Example 11 exhibited significantly greater anti-dye transfer properties as compared to the same detergent composition without the polymer or copolymer.

EXAMPLE 13

Synthesis of a Copolymer of Dimethylaminoethyl Methacrylate Betaine and Vinyl Pyridinium Sultaine The dimethylaminoethyl methacrylate betaine was prepared by mixing 36.9 g of sodium chloroacetate and 50.0 g of dimethylaminoethyl methacrylate monomer in 100 grams of deionized water. The mixture was heated to 40° C. and held for a period of 16 hours. A clear water like solution was obtained.

A mixture of 50 grams of water and 30 grams of isopropanol was added to a reactor and the pH was lowered to 2 by addition of a few drops of concentrated sulfuric acid. The mixture was heated to 80° C. A monomer feed consisting of 75 grams of the dimethylaminoethyl methacrylate betaine solution and 13.4 grams of 4-vinyl pyridine were added to the reactor over a period of 1 hour. This was accompanied by simultaneous addition of an aqueous solution of 0.4 grams of ammonium persulfate in 15 grams of deionized water over a period of 1.5 hours. The reaction mixture was held at 80° C. for 1 to 2 hours. An aqueous solution containing 25 grams of 3-chloro-2-hydroxy-1-propane sulfonic acid, sodium salt hydrate dissolved in 40 grams of deionized water was added to the reactor over a period of 15 minutes. The reaction was held at 80° C. for 13 to 14 hours. The isopropanol was distilled off while slowly raising the temperature to 100° C. After cooling, the product was a dark brown aqueous solution.

EXAMPLE 14

Evaluation of the Anti-dye Transfer Properties of the Copolymer of Dimethylaminoethyl Methacrylate Betaine and Vinyl Pyridinium Sultaine Prepared in Example 13 in a Detergent Composition The test involved washing 1 white cotton swatch with 4 swatches dyed with Direct Blue 1, 4 swatches dyed with Direct Blue 90, and 1 white cotton 400. These swatches are commercially available from Test Fabrics in New Jersey. The test was conducted in a terg-o-tometer using 1.3 g/L of Wisk liquid detergent and 1.0 wt. polymer. The test was conducted at 93.4° F., 80 rpm and 110 PPM hardness water. The wash was 20 minutes and was followed by a 3 minute rinse. The swatches were then dried and the L values (whiteness) of the white swatches were measured using a Minolta colorimeter. A higher L value for the white swatch indicate that less dye is being transferred to the swatch and is a measure of the effectiveness of the dye transfer polymer. The test results are summarized in Table VII.

TABLE VII

Evaluation of anti-dye transfer properties.

| Copolymer of dimethylaminoethyl methacrylate betaine and vinyl pyridinium sultaine | L value of white swatch |
|---|---|
| None | 78.5 |
| Example 13 | 82.6 |

The test results in Table VII show that detergent compositions containing the copolymer of dimethylaminoethyl methacrylate betaine and vinyl pyridinium sultaine prepared in Example 13 exhibited significantly greater anti-dye transfer properties as compared to the same detergent composition without the copolymer.

While the invention has been described with particular reference to certain embodiments thereof, it will be understood that changes and modifications may be made by those of ordinary skill in the art within the scope and spirit of the following claims.

What is claimed is:

1. A water-soluble polyvinylpyrridinium derivative copolymer comprising a quaternary nitrogen and an anionic moiety selected from a sulfonate or a carboxylate functionality, said polyvinylpyrridinium derivative copolymer having the structure

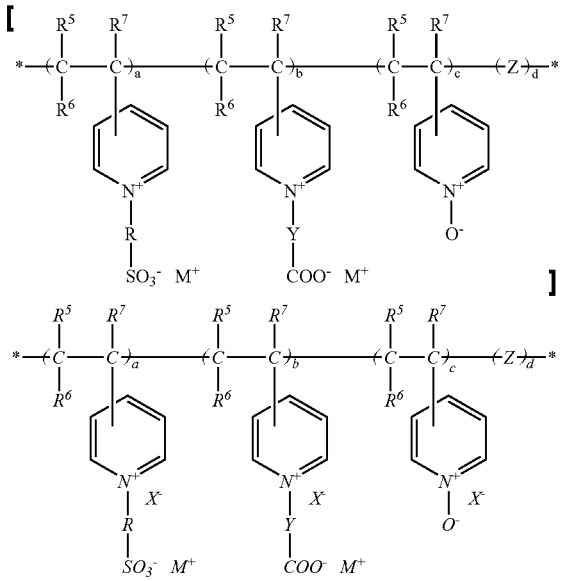

wherein a is a repeating unit of 1 to 100; b is a repeating unit of 0 to 99; c is a repeating unit of 0 to 99; d is a repeating unit of from 1 to 99; R is selected from the group consisting of $(CR_1R_2)_{m1}$, benzene, and substituted benzene; Y is selected from the group consisting of $(CR_3R_4)_{m2}$, benzene, and substituted benzene; substituted benzene is independently a benzene substituted with a group selected from the group consisting of amino [moeity] *moiety*, nitro moiety, halogen moiety, and combinations thereof; Z is derived from an ethylenically unsaturated monomer, $m_1$ and $m_2$ are independently 0 to 10; $M^+$ is independently a cation wherein M is selected from the group consisting of hydrogen, ammonia, alkali metals, alkaline earth metals, zinc, copper, organic amines, amino acids, and amino saccharides; $R_1$, $R_2$, $R_3$, and $R_4$ are independently selected from the group consisting of hydrogen, hydroxyl, alkyl having $C_1$ to $C_6$, aryl having $C_6$ to $C_{18}$, and alkaryl having $C_7$ to $C_{18}$; $R_5$, $R_6$, and $R_7$ are hydrogen; and $X^-$ is independently a halide, with the proviso that if Y is benzene or substituted benzene then a is 0 to 99 and b is 1 to 100;

and wherein the ethylenically unsaturated monomer is selected from the group consisting of dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl arcylate, diethylaminopropyl methacrylate, dimethylaminobutyl acrylate, dimethylaminobutyl methacrylate, dimethylaminoneopentyl acrylate, dimethylaminoneopentyl methacrylate, dimethylaminoethylacrylamide, dimethylamino ethylmethacrylamide, diethylaminoethylacrylamide, diethylaminoethylmethacrylamide, dipropylamino ethylacrylamide, dipropylaminoethylmethacrylamide dimethylaminopropylacrylamide, dimethylamino propylmethacrylamide, diethylaminopropyl acrylamide, diethylaminopropylmethacrylamide, dimethylaminoneopentylacrylamide, dimethyl aminoneopentylmethacrylamide, dialkylamino butylacrylamide, vinyl [pyrrolidone] *pyridine*, vinyl imidazolidone, [dimethylaminoethylmethacrylate, and dimethylaminoethylacrylate,] and combinations thereof.

2. A laundry detergent composition comprising:

a) 0.01 to 90 weight percent, based on the total weight of the detergent composition, of a water-soluble polyvinylpyrridinium derivative copolymer comprising a quaternary nitrogen and an anionic moiety selected from a sulfonate or a carboxylate functionality, said polyvinylpyrridinium derivative copolymer having the structure

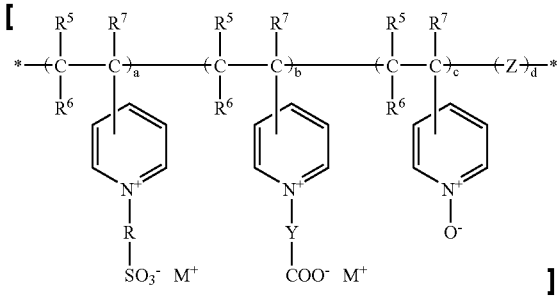

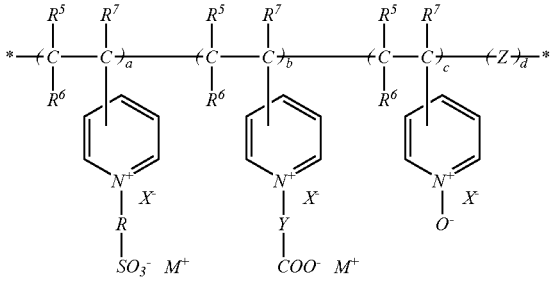

wherein a is a repeating unit of 1 to 100; b is a repeating unit of 0 to 99; c is a repeating unit of 0 to 99; d is a repeating unit of from 1 to 99; R is selected from the group consisting of $(CR_1R_2)_{m1}$, benzene, and substituted benzene; Y is selected from the group consisting of $(CR_3R_4)_{m2}$, benzene, and substituted benzene; substituted benzene is independently a benzene substituted with a group selected from the group consisting of amino [moeity] *moiety*, nitro moiety, halogen moiety, and combinations thereof; Z is derived from an ethylenically unsaturated monomer, $m_1$ and $m_2$ are independently 0 to 10; $M^+$ is independently a cation wherein M is selected from the group consisting of hydrogen, ammonia, alkali metals, alkaline earth metals, zinc, copper, organic amines, amino acids, and amino saccharides; $R_1$, $R_2$, $R_3$, and $R_4$ are independently selected from the group consisting of hydrogen, hydroxyl, alkyl having $C_1$ to $C_6$, aryl having $C_6$ to $C_{18}$, and alkaryl having $C_7$ to $C_{18}$; $R_5$, $R_6$, and $R_7$ are hydrogen; and $X^-$ is independently a halide, with the proviso that if Y is benzene or substituted benzene then a is 0 to 99 and b is 1 to 100; and b) at least one ingredient selected from the group consisting of builders, enzymes, enzyme [stablizers] *stabilizers*, optical brighteners, bleaches, bleach boosters, bleach activators, dye transfer agents, [dispersents] *dispersants*, enzyme activators, suds suppressers, dyes, perfumes, colorants, filler salts, hydrotropes, and mixtures thereof.

3. The laundry detergent composition according to claim 2 wherein a is a repeating unit of 50 to 100; b is a repeating unit of 0 to 10; c is a repeating unit of 0 to 10; d is a repeating unit of 50 to 99; R is selected from the group consisting of $(CR_1R_2)_{m1}$ and benzene: Y is selected from the group consisting of $(CR_3R_4)_{m2}$ and benzene; Z is derived from a nitrogen-containing ethylenically unsaturated monomer; $m_1$ and $m_2$ are independently 0 to 6; $M^+$ is independently a cation wherein M is sodium or potassium; $R_1$, $R_2$, $R_3$, and $R_4$ are independently selected from hydrogen or hydroxyl; and $X^-$ is independently a halide selected from the group consisting of fluoride, chloride, iodide, and bromide.

4. The laundry detergent composition according to claim 2 wherein the enzyme is a protease enzyme.

5. The laundry detergent composition according to claim 2 wherein the polyvinylpyrridinium derivative copolymers is present in an amount of from 0.05 to 20 weight percent.

6. The laundry detergent composition according to claim 5 wherein the polyvinylpyrridinium derivative copolymer is present in an amount of from 0.1 to 10 weight percent.

7. A process for inhibiting dye transfer from one fabric to another during fabric laundering operations involving colored fabrics, said process comprises contacting fabrics with a laundering solution comprising:

a) a water-soluble polyvinylpyrridinium derivative copolymer comprising a quaternary nitrogen and an anionic moiety selected from a sulfonate or a carboxylate functionality, said polyvinylpyrridinium derivative copolymer having the structure

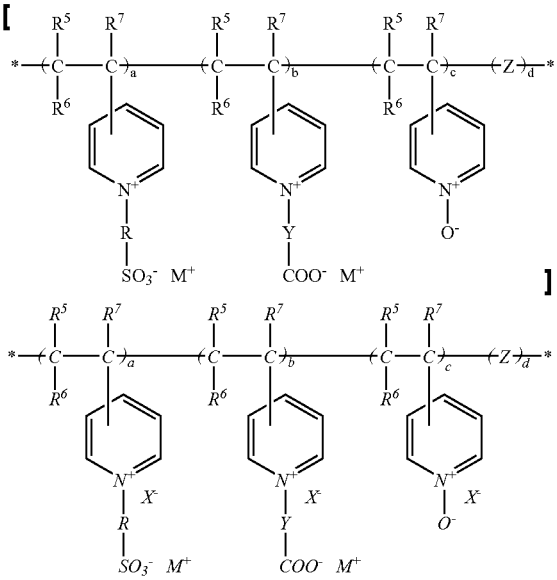

wherein a is a repeating unit of 1 to 100; b is a repeating unit of 0 to 99; c is a repeating unit of 0 to 99; d is a repeating unit of from 1 to 99; R is selected from the group consisting of $(CR_1R_2)_{m1}$, benzene, and substituted benzene; Y is selected from the group consisting of $(CR_3R_4)_{m2}$, benzene, and substituted benzene; substituted benzene is independently a benzene substituted with a group selected from the group consisting of amino [moeity] *moiety*, nitro moiety, halogen moiety, and combinations thereof; Z is derived from an ethylenically unsaturated monomer, $m_1$ and $m_2$ are independently 0 to 10; $M^+$ is independently a cation wherein M is selected from the group consisting of hydrogen, ammonia, alkali metals, alkaline earth metals, zinc, copper, organic amines, amino acids, and amino saccharides; $R_1$, $R_2$, $R_3$, and $R_4$ are independently selected from the group consisting of hydrogen, hydroxyl, alkyl having $C_1$ to $C_6$, aryl having $C_6$ to $C_{18}$, and alkaryl having $C_7$ to $C_{18}$; $R_5$, $R_6$, and $R_7$ are hydrogen; and $X^-$ is independently a halide, with the proviso that if Y is benzene or substituted benzene then a is 0 to 99 and b is 1 to 100; and b) at least one ingredient selected from the group consisting of builders, enzymes, enzyme [stablizers] *stabilizers*, optical brighteners, bleaches, bleach boosters, bleach activators, dye transfer agents, [dispersents] *dispersants*, enzyme activators, suds suppressers, dyes, perfumes, colorants, filler salts, hydrotropes, and mixtures thereof.

8. A fabric softening composition comprising a) 0.01 to 90 weight percent, based on the total weight of the fabric softening composition, of a water-soluble polyvinylpyrridinium derivative copolymer comprising a quaternary nitrogen and an anionic moiety selected from a sulfonate or a carboxylate functionality, said polyvinylpyrridinium derivative copolymer having the structure

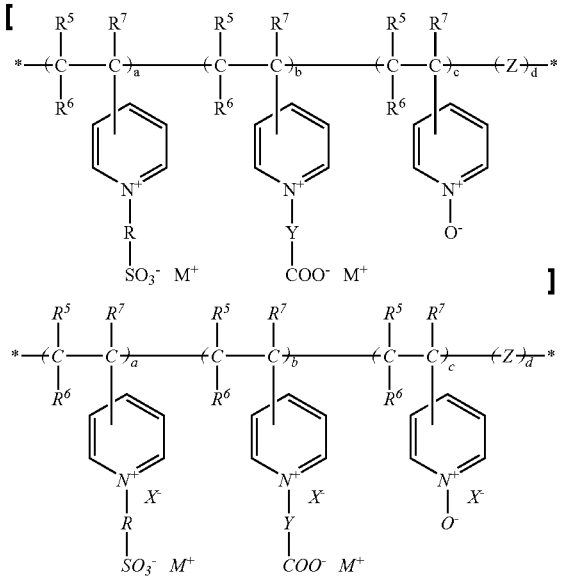

wherein a is a repeating unit of 1 to 100; b is a repeating unit of 0 to 99; c is a repeating unit of 0 to 99; d is a repeating unit of from 1 to 99; R is selected from the group consisting of $(CR_1R_2)_{m1}$, benzene, and substituted benzene; Y is selected from the group consisting of $(CR_3R_4)_{m2}$, benzene, and substituted benzene; substituted benzene is independently a benzene substituted with a group selected from the group consisting of amino [moeity] *moiety*, nitro moiety, halogen moiety, and combinations thereof; Z is derived from an ethylenically unsaturated monomer, $m_1$ and $m_2$ are independently 0 to 10; $M^+$ is independently a cation wherein M is selected from the group consisting of hydrogen, ammonia, alkali metals, alkaline earth metals, zinc, copper, organic amines, amino acids, and amino saccharides; $R_1$, $R_2$, $R_3$, and $R_4$ are independently selected from the group consisting of hydrogen, hydroxyl, alkyl having $C_1$ to $C_6$, aryl having $C_6$ to $C_{18}$, and alkaryl having $C_7$ to $C_{18}$; $R_5$, $R_6$, and $R_7$ are hydrogen; and $X^-$ is independently a halide, with the proviso that if Y is benzene or substituted benzene then a is 0 to 99 and b is 1 to 100; and b) at least one ingredient selected from the group consisting of builders, enzymes, enzyme [stablizers] *stabilizers*, optical brighteners, bleaches, bleach boosters, bleach activators, dye transfer agents, [dispersents] *dispersants*, enzyme activators, suds suppressers, dyes, perfumes, colorants, filler salts, hydrotropes, and mixtures thereof.

9. The fabric softening composition according to claim 8 wherein the polyvinylpyrridinium derivative *copolymer* is present in an amount of from 0.05 to 20 weight percent.

* * * * *